United States Patent [19]

Stolarczyk

[11] E Patent Number: Re. 33,458

[45] **Reissued Date of Patent:* Nov. 27, 1990**

[54] METHOD FOR CONSTRUCTING VERTICAL IMAGES OF ANOMALIES IN GEOLOGICAL FORMATIONS

[75] Inventor: Larry G. Stolarczyk, Raton, N. Mex.

[73] Assignee: Stolar, Inc., Raton, N. Mex.

[ * ] Notice: The portion of the term of this patent subsequent to Mar. 18, 2003 has been disclaimed.

[21] Appl. No.: 354,514

[22] Filed: May 18, 1989

Related U.S. Patent Documents

Reissue of:

[64] Patent No.: 4,742,305
Issued: May 3, 1988
Appl. No.: 874,593
Filed: Jun. 16, 1986

U.S. Applications:

[60] Continuation-in-part of Ser. No. 812,625, Dec. 23, 1985, Pat. No. 4,691,166, which is a division of Ser. No. 731,741, May 6, 1985, Pat. No. 4,577,153.

[51] Int. Cl.[5] ..... G01V 3/12; G01V 3/30; G01V 3/38

[52] U.S. Cl. ..... 324/334; 324/338

[58] Field of Search ..... 324/334–338, 324/341, 372; 166/248, 250; 455/39–41

[56] References Cited

U.S. PATENT DOCUMENTS

| | | | |
|---|---|---|---|
| 2,183,565 | 12/1939 | Hawley | 324/372 |
| 2,268,106 | 12/1941 | Blau | 324/335 |
| 2,575,340 | 11/1951 | Goldstein | 324/334 |
| 4,161,687 | 7/1979 | Lytle et al. | 324/338 |
| 4,577,153 | 3/1986 | Stolarczyk | 324/334 |

FOREIGN PATENT DOCUMENTS

| | | | |
|---|---|---|---|
| 1057519 | 2/1967 | United Kingdom | 324/338 |

*Primary Examiner*—Gerard R. Strecker
*Attorney, Agent, or Firm*—Thomas E. Schatzel

[57] ABSTRACT

Apparatus and method for detecting geological anomalies occuring in geological formations. The instrumentation comprises a medium frequency continuous wave narrowband FM transmitter and receiver pair. Two instrument configurations are downhole instruments for insertion into boreholes. Survey procedures are provided to detect anomalies through signal attenuation, path attenuation and signal phase shift. Continuity measurements at different depths in the drillholes provide data to determine the existence of anomalies. Tomographic techniques are employed to provide a visual image of the anomaly. Computer aided reconstruction techniques provide such visual images from the generated data.

7 Claims, 6 Drawing Sheets

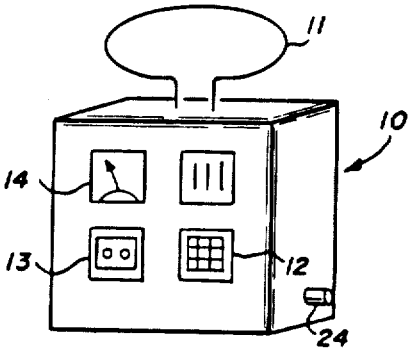
Fig_1
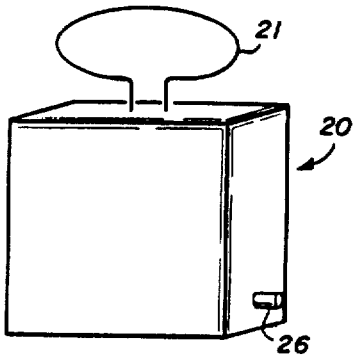
Fig_2
Fig_3a
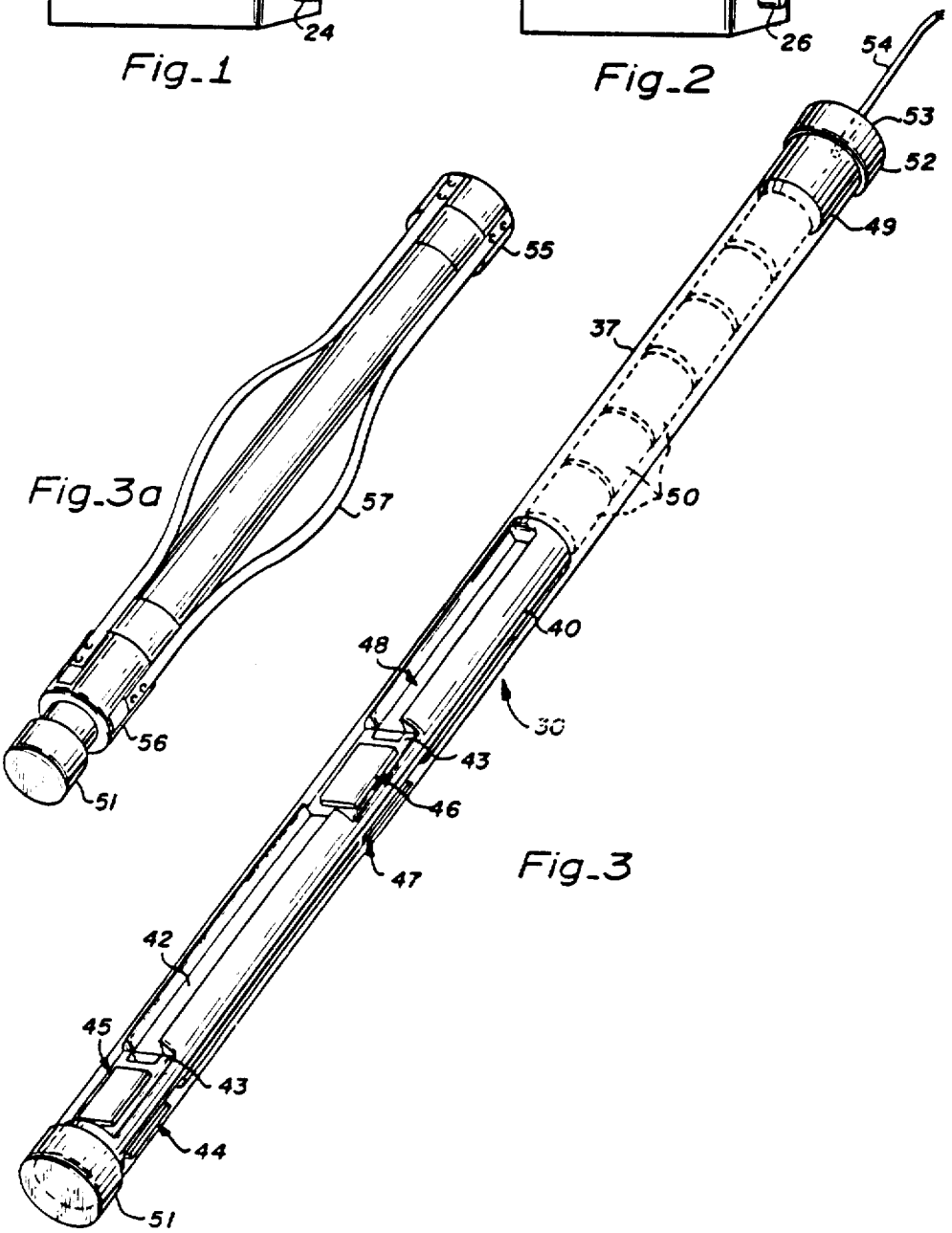
Fig_3

METHOD FOR CONSTRUCTING VERTICAL IMAGES OF ANOMALIES IN GEOLOGICAL FORMATIONS

Matter enclosed in heavy brackets [ ] appears in the original patent but forms no part of this reissue specification; matter printed in italics indicates the additions made by reissue.

BACKGROUND OF THE INVENTION

This application is a continuation-in-part of patent application Ser. No. 06/812,625, filed Dec. 23, 1985, now U.S. Pat. No. 4,691,166, which is a divisional of Ser. No. 06/731,741, filed May 6, 1985, now U.S. Pat. No. 4,577,153, issued Mar. 18, 1986.

FIELD OF THE INVENTION

This invention relates generally to instrumentation and procedures for detecting geological anomalies in geological formations and more specifically to continuous-wave low and medium frequency radio imaging techniques combined with computer aided reconstruction to provide graphic radiogenic images of seam anomalies.

DESCRIPTION OF THE PRIOR ART

Coal seams or deposits occurring in layered formations have been distorted by many different types of geological mechanisms. Differential compaction occurring in surrounding layers causes faults, twists and rolls to occur in the seam. Ancient streams have washed coal from beds leaving sand and rock deposits. These deposits, known as fluvial channel sand scours, can cause washouts and weak roof. Such stream distortions and rock deposits are physical barriers to mining equipment. Two types of underground mining techniques are extensively used in the coal mining industry. One type, referred to as room and pillar, or continuous mining, can mine around many of these barriers. The continuous mining technique is less expensive and requires less manpower. For example, set-up generally requires three shifts of eight people. Continuous mining, however, produces only approximately 300 tons per shift. Longwall mining, the other widely used technique, is much more efficient in uniform coal beds. This method yields production rates averaging 1500 tons per shift.

In the United States, the Mining Safety and Health Administration requires that retreating, rather than advancing longwalls be used. On the other, in Europe, advancing longwalls are extensively used. Retreating longwalls are set up to mine in the direction of the main entry, whereas advancing longwalls mine away from the main entry. Continuous mining techniques are employed to set up the retreating longwall. From the main entry, entry ways are mined at right angles to the main entry and on either side of the longwall panel. These entry ways, the head gate entry and tail gate entry respectively, extend the length of the longwall panel. At the end of the panel, a crosscut is made between the head gate and the tail gate entries. The wall of the crosscut facing the main entry is the longwall face. The longwall machine is set up along the face with a heading toward the main entry. As the longwall moves forward, the roof caves in over the mined out area. A barrier block of unmined coal is left at the end of the run to support the roof over the main entry.

The high yield of longwall mining makes it economically advantageous to use where a long panel can be mined. A typical longwall panel contains from 500,000 to 1,000,000 tons of coal. The initial investment and set-up cost of longwall mining are high. Equipment cost averages many millions of dollars. Longwall set-up requires thirty days minimum, at three shifts per day, with twelve to fourteen men per shift. Thus, set-up expenses are very large as a result and to achieve the low cost production advantage of the longwall method, a uniform coal seam is necessary to ensure a long production run. Seam anomalies such as faults, washouts, interbeddings and dikes can cause premature termination of the longwall production run. In many instances, longwalls become "ironbound" after encountering an anomaly. Removal of such "ironbound" equipment requires blasting which can damage equipment and exposes miners to extreme danger. Accordingly, if seam anomalies could be detected and analyzed in advance of mining, the mining techniques could be planned for minimum production cost. Where the survey discloses a long continuous coal seam, the low cost longwall technique can be employed. If barriers to longwall mining are discovered, the mine engineering department can use continuous mining to mine around the barriers.

Geological surveys for potentially productive coal formations use many well known procedures. These procedures employ a wide variety of technologies. Satellite imaging and photography provide global data for use by mine geologists. However, because of the broad overview of the data they are of no value in determining the mineability of a coal seam. Macrosurvey (foot prospecting) of surface strata and outcrop features enable geologists to forecast formation characteristics based upon prior knowledge. Surface based seismic and electromagnetic wave propagation procedures are extensively used in geophysical surveys for valuable deposits including oil and gas. The microsurvey techniques, however, are not reliable in examining the detailed structure in a coal seam.

Various microsurveying in-seam seismic techniques are currently employed to yield useful data concerning seam anomalies. A technique under development in Europe comprises firing shots of sixteen points into a block of 120 geophone groups, each consisting of thirty-six geophones. Computerized processing of the seismic data results in the detection of faults. To date, the procedure requires placing charges at five foot intervals and requires the installation of extensive cabling. Seismic techniques are primarily intended for advancing, rather than retreating longwalls. Further, this method has not proven to have the capability of resolving channel sand anomalies, especially for partial washouts and smaller, less significant anomalies, nor can they detect roof/-floor rock conditions. The emerging of the surface based spectral magnetotelluric method with controlled sources may have the capability of seeing into the earth's crust. This method appears to be useful in detecting major faults in layered formations, but cannot resolve detailed seam structure.

Downhole drilling has been used to probe longwall blocks. A ten-twelve hole pattern drilled six-hundred feet into the panel provides samples of the coal in the seam. This method, however, has the disadvantage of covering only a small percentage of the block. Because of this limited coverage, this technique is not useful to detect and resolve seam anomalies that may exist in the seam between the boreholes. Surface core drilling and logging remains the most reliable source of seam information. Core sampling provides useful data in mapping stratified mediums. Logging enables probing of the formation in the vicinity of the drillhole. None of the currently used logging methods can detect and resolve seam anomalies that may exist in the seam between the bore holes over distances greater than about fifty feet. In-seam horizontal drilling can detect seam anomalies, but is subject to the same coverage limitations of vertical drilling. Horizontal drilling, additionally, is very expensive, averaging twenty cents per ton of coal produced.

Electromagnetic technologies have been investigated in an attempt to provide a geophysical method to see within the coal seams. Conventional and synthetic radar techniques have been reported in the literature. Because of the high frequency of the radar, it is exceedingly useful in investigating the geological structure in near proximity to the borehole. Deep seam penetration, however, requires very high transmit power in order to maintain any sort of useful resolution. This is because high frequency signals are attentuated very rapidly with distance in the seam. Accordingly, present radar methods cannot see deep into the seam.

Publications by R. J. Lytle, Cross Borehole Electromagnetic Probing to Locate High-Contrast Anomalies, Geophysics, Vol. 44, No. 10, October 1979; and Computerized Geophysical Tomography. Proceedings of the IEEE, Vol. 67, No. 7, July 1979, have described a method of imaging coal seams using continuous wave (CW) signals. His method proposed only tomographic imaging between nearby boreholes. The method of Lytle had limited range and resolution, because of the limited spatial measurements that could be taken using downhole probes. To satisfy the requirements for tomography, Lytle used a higher frequency range, thus achieving less range. Further, the conductivity of rock was found to be much greater than the conductivity of coal. Where the difference conductivity (contrast) is large, the tomography algorithm will diverge rather than converge, resulting in no image.

A study conducted by Arthur D. Little, Inc. for the U.S. Bureau of Mines investigated continuous-wave medium-frequency signal propagation in coal. The results, published by Alfred G. Emslie and Robert L. Lagace, Radio Science, Vol. II, No. 4, April 1976, dealt with the use of electromagnetic waves for communication purposes only. Additionally, errors may be present in the wave propagation equations employed.

Other electromagnetic techniques suffer similar range and resolution problems. None of the prior art recognized the existence of a coal seam transmission window in the 100–800 kHz range. Accordingly, none of the prior art achieved a long range, high resolution imaging of geological anomalies.

BRIEF DESCRIPTION OF THE INVENTION

Accordingly, it is an object of the present invention to provide instrumentation and procedures for in-seam and surface imaging of geological formation anomalies with a range sufficient to image an entire longwall panel.

It is a further object of the present invention to provide instrumentation and procedures to image coal seam anomalies with resolution sufficient to detect faults, full and partial washouts, fluvial channel sand scours, dikes and interbeddings.

It is a further object of the present invention to minimize production costs by surface mapping of fault directions, and providing longwall headings where appropriate.

It is another object of the present invention to minimize production costs by in-seam imaging of longwall panels, after the panel headings have been developed.

An additional object of the present invention is to mitigate or eliminate hazards to miners resulting from unexpected geological anomalies.

Briefly, a preferred embodiment of the present invention includes a continuous wave low and medium frequency transmitting with FM capabilities and equipped with a directional loop antenna, a continuous wave medium frequency receiver equipped with a directional loop antenna (short magnetic dipole) and capable of accurately measuring and recording the received signal amplitude and phase shift of the transmitted signal, and data processing means for producing a pictorial representation of the coal seam from the raw data generated. Both the transmitter and the receiver are portable and are designed in two configurations: a cylindrical configuration, referred to as a sonde, for insertion down boreholes adjacent to a coal seam, and a portable, or entry configuration adaptable for in-seam use.

The invention further includes survey procedures for imaging structures in coal seams. Two methods of seam imaging are provided with procedure selection dependent on terrain and seam depth. Surface based seam imaging with downhole continuity instruments is expected to be used in moderately shallow beds with good surface drilling conditions. In-seam imaging and tomographic techniques will be used when a clear picture of the seam structure is required.

The preferred embodiment utilizes continuous wave low and medium frequency (MF) signals to achieve high resolution imaging of geophysical anomalies in coal seams with relatively low output power. Because the coal seam is bounded above and below by rock with a differing conductivity, at certain signal frequencies electromagnetic energy becomes trapped and will propagate over great distances. This transmission window, or coal seam mode, is excited by the turned loop (short magnetic dipole) antennas employed in the preferred embodiment causing the MF signals to travel several hundred meters in the coal seam. Seam anomalies create regions with different electrical constitutive parameters relative to the coal. This electrical contrast between the coal and the anomalous structure gives rise to the imaging method. The contrast will change the wave propagation constant in the region whereby the wave received on the far side of the region can be analyzed to determine structure between the transmitter and receiver.

The low and MF in-seam continuity and tomography instruments further employ MF signals with a narrow occupied spectrum bandwidth. The receiving instruments detect and measure the signals with phase-locked-loop (PLL) techniques. PLL receivers extend the signal detection threshold well into the noise, thus enhancing operating range. The continuity imaging procedure is used where relatively large electrical contrast between the coal seam and anomalous structure is present. Tomography is applicable when a small electrical contrast exists. Tomography instrumentation can improve resolution by making more spatial measurements, thus overcoming the inherent radar range limitations.

The downhole procedure will require a drilling plan that will enable the medium frequency signal to propagate in the seam between boreholes. In this procedure, a plurality of holes are drilled on either side of the seam. The transmitter and receiver probes are inserted into the boreholes on opposite sides of the seam and signal attenuation is measured across the seam. A series of data points is generated by communicating with a receiver and a transmitter at differing levels within downholes to establish vertical profiles and varying the location of the transmitter and receiver across the series of boreholes to establish a horizontal profile. Signal attenuation, path attenuation, and phase shift are measured and compared with calculated values to determine if seam anomalies are present. Additionally, this data can be reconstructed by computer assisted imaging techniques to provide a pictorial representation of the seam. When a fault is detected additional boreholes are drilled bisecting boreholes in the original drilling plan and further readings are taken to localize the fault. The in-seam imaging technique is carried out in a similar manner to the surface based imaging technique, except the transmitter and receiver instruments are located in the head and tail gate entries adjacent to the seam.

Additionally, the instrumentation can be used to improve mining safety by detecting coal seam fire headings. Fire in the seam affects the coal seam's conductivity and will thus be detected in the same manner as anomalies are detected. Where a fire is known to exist, the in-seam detection methods are used to localize it so it can be controlled. In another application, communications with trapped miners can be established by equipping the miners with small receivers or transceivers. By drilling in the suspected area of the trapped miner, the downhole instrument can excite the coal seam mode and be used to communicate with the trapped miner.

It is an advantage of the present invention that graphical representation of geological formation anomalies are developed by the imaging technique.

It is an advantage of the present invention that vertical scanning can be accomplished to establish a vertical image of the geological area under study.

It is another advantage of the present invention that production costs can be minimized by selecting the appropriate mode of mining the coal.

It is a further advantage of the present invention that the imaging can be carried out using a minimum of equipment and a minimum of boreholes.

It is a further advantage of the present invention that imaging can be accomplished using a relatively low transmitter power.

It is a further advantage of the present invention that mining safety can be improved through the detection of geological anomalies in the working phase.

It is yet another advantage that partial washouts caused by fluvial channel sand scour can be detected by the present invention.

It is a further advantage that roof/floor rock conditions can be determined by the present invention.

It is yet another advantage of the present invention that the instrumentation can be used to communicate with trapped miners, thus increasing mining safety.

It is a further advantage that coal seam fire headings can be determined with the present invention.

These and other objects and advantages of the present invention will no doubt become obvious to those of oridinary skill in the art after having read the following detailed description of the preferred embodiments as illustrated in the various drawing figures.

IN THE DRAWINGS

FIG. 1 is a front elevational view of an in-seam receiver for use in the present invention;

FIG. 2 is a front elevational view of an in-seam transmitter for use in the present invention;

FIG. 3 is a partial cut-away view of a downhole probe for use with the present invention;

FIG. 3a is a front elevational view of a downhole probe fitted with a borehole probe centralizer;

Figure 11:
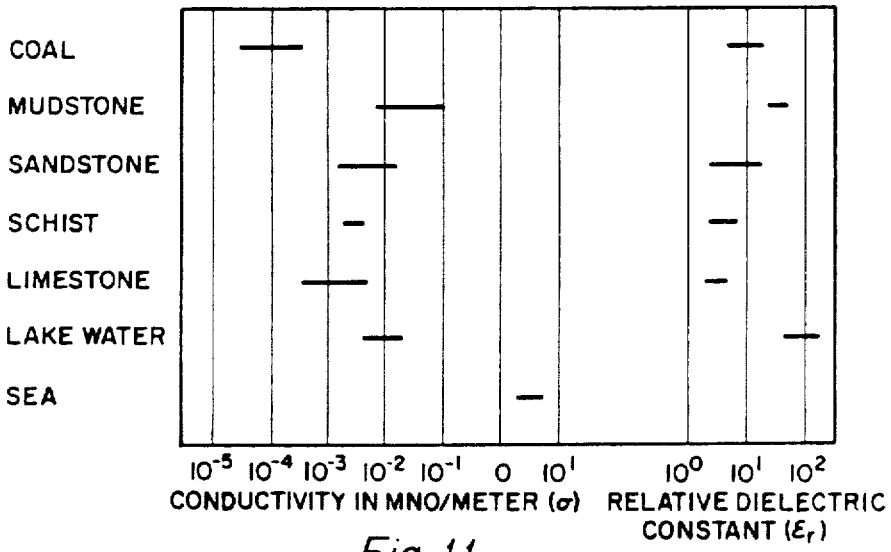

FIG. 11 graphically illustrates electrical parameters of various materials; and

Figure 12:
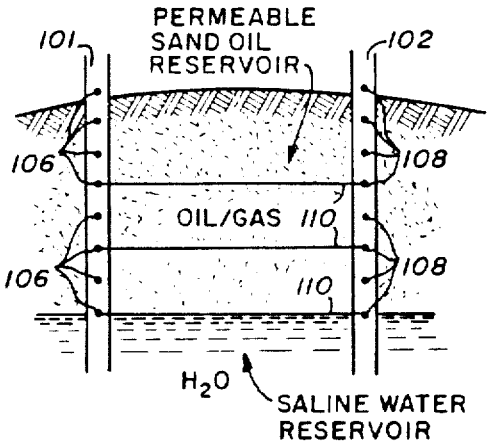

FIG. 12 is a diagrammatical illustration of applying the present invention for detection of petroleum products.

DESCRIPTION OF THE PREFERRED EMBODIMENT

FIG. 1 illustrates a portable-continuous wave low and medium frequency (CWLMF) receiver for in-seam tomographic imaging. As used herein, tomography is a generic term to denote an electromagnetic process of imaging structure in a coal seam using low and medium frequency (LMF) signals. The imaging process may or may not use the tomography algorithm. The receiver is designated by the general reference character 10 and is of the single conversion, superhetrodyne type with a frequency range of 100 to 800 kHz, tunable in five kHz increments. Receiver 10 is designed to automatically measure field strength of a transmitted signal, and to covert this measured field strength into a digital signal for subsequent data processing. Receiver 10 includes a tuned loop antenna 11, a distance logging keyboard 12, a magnetic tape recorder 13 and a field strength display 14.

Figure 4:
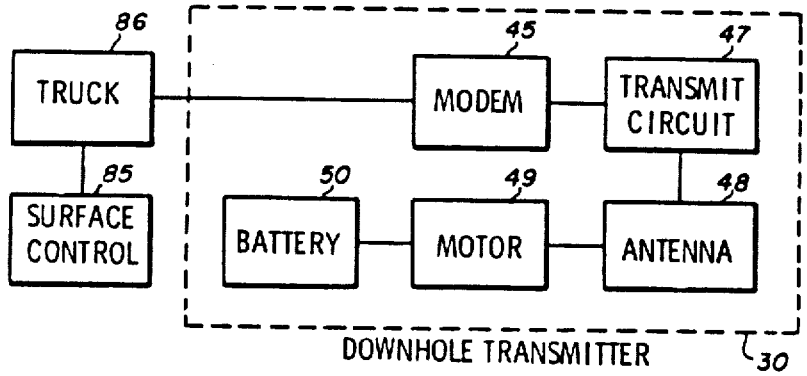
FIG. 4 is a schematic representation of the modular components of the downhole receiver and transmitter probes of FIG. 3.
Figure 4:
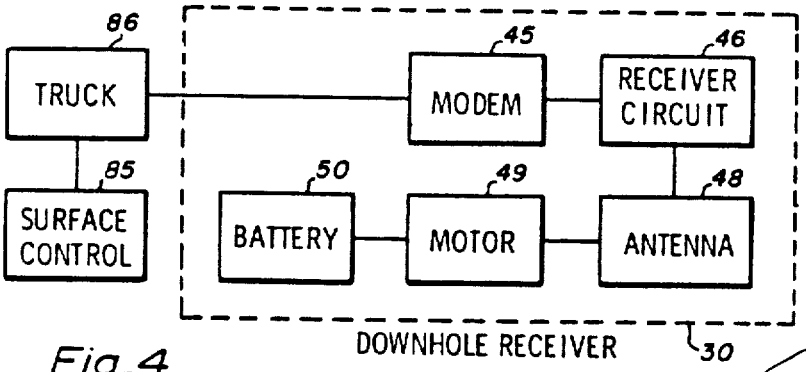
Figure 5:
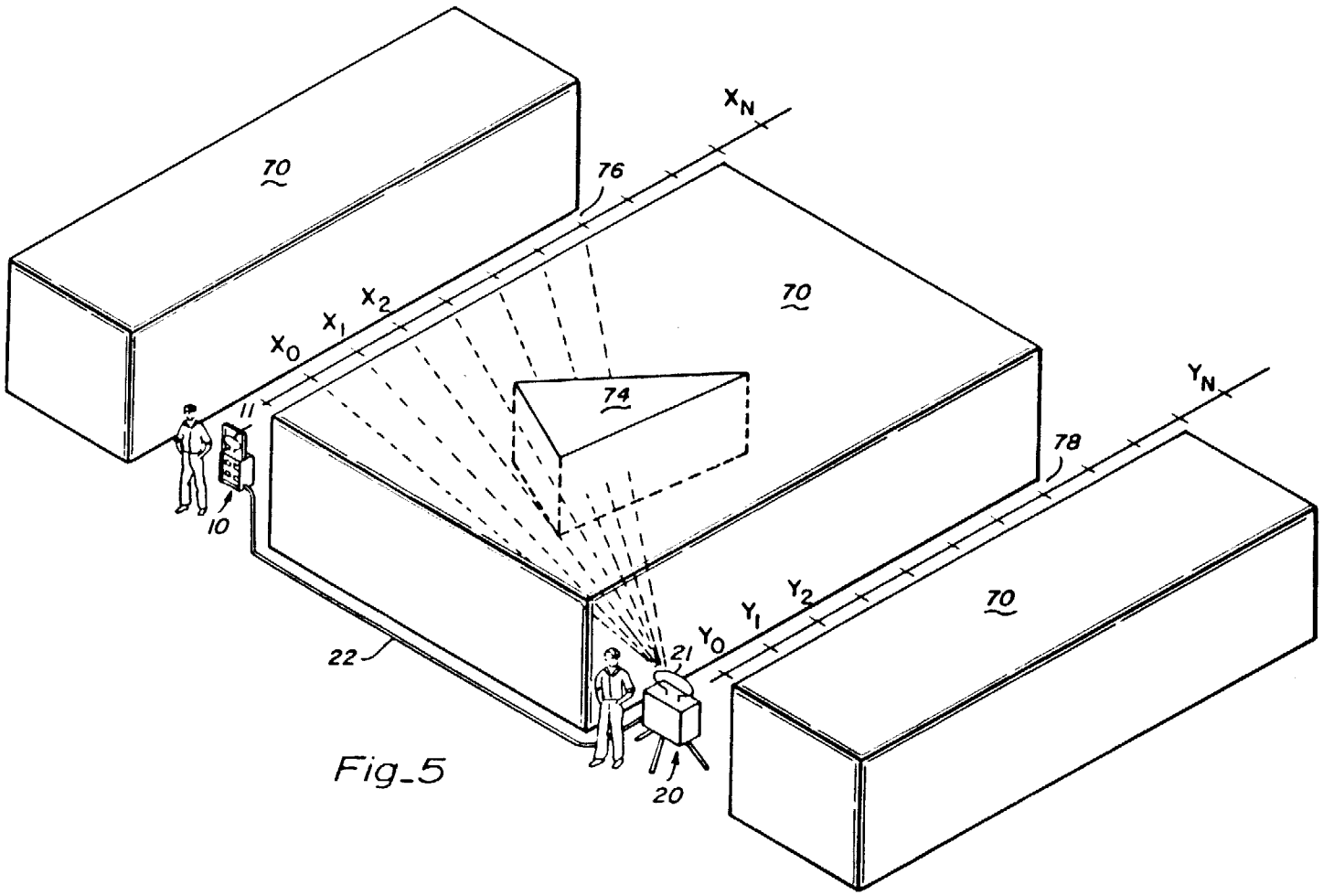
FIG. 5 is an idealized cut-away view of a coal seam showing the location of the transmitter of FIG. 2 and receiver of FIG. 1 for in-seam tomography.

FIG. 2 illustrates a continuous wave low and medium-frequency transmitter referred to by the general reference character 20. The transmitter 20 is a class B transmitter with a frequency range of 100 to 800 kHz, tunable in five kHz increments. The output power of transmitter 20 is twenty watts. This is sufficient to provide a range of at least 1550 feet at 520 kHz, depending on the medium. Transmitter 20 is equipped with a tuned loop antenna 21. The transmitter 20 and receiver 10 are constructed in a configuration adaptable for in-seam use as later described herein and illustrated in FIG. 4. In addition to the continuous wave signal capability of receiver 10 and transmitter 20, the transmitter 20 is further designed to generate and transmit narrowband frequency modulation (FM) signals, and the receiver 10 is further designed to receive narrowband FM signals and to demodulate those signals. This capability allows for phase shift measurements which yields additional useful data in detecting and imaging the geological anomalies. For such measurements, a reference signal must be sent from the transmitter 20 to the receiver 10. This signal is sent through fiber optics cable 22 as shown in FIG. 5. Fiber optics cable 22 is coupled to receiver 10 through reference cable connector 24, and is coupled to transmitter 20 through connector 26.

In-seam imaging requires access immediately adjacent the coal seam. In situations where the head and tail gate entries have not been cut, as in the case of advancing longwall mining, or where the bed is moderately shallow with good surface drilling characteristics, surface based imaging employing downhole probes can be used. FIG. 3 illustrates the general configuration of a downhole probe, or sonde and referred to by the general reference character 30. The probe 30 is of a cylindrical configuration for insertion down a standard size borehole. Probe 30 includes an outer hollow structural cylinder 37 of a diameter of about two and one-quarter inches. Cylinder 37 may be constructed of a variety of materials, and in the preferred embodiment is of a radiolucent material such as fiberglass. Rotatably mounted within cylinder 37 is a support frame 40. Support frame 40 is a solid cylinder with a longitudinal trough 42 ending at a pair of opposing flat faces 43. Mounted on each of the flat faces 43 is a modular circuit board including antenna heading control 44, modem 45 and either a receiver 46 or a transmitter 47, depending on whether receive or transmit capability is desired of the probe. Located in longitudinal trough 42 are conductors of a tuned loop antenna 48. Because of the directional nature of the radio transmissions through tuned loop antenna 48, means must be provided to mechanically orient the respective antennas of the receiver and transmitter probes to a co-planar alignment. This is accomplished by rotating the frame 40 within the outer cylinder 37 by means of a drive motor 49. Drive motor 49 is fixed to the proximal end of cylinder 37 and mechanically coupled to frame 40 whereby frame 40 can be rotated through a full 360° within the cylinder 37. In the preferred embodiment, power to drive motor 49 is supplied by six nickel-cadmium batteries 50 fixed to the proximal end of support frame 40, just below drive motor 49. AC power could also be supplied downhole and rectified at the probe to create the required DC voltage from the probe circuitry. Cylinder 37 is sealed at its distal end by an end cap 51 and at its proximal end by an end cap 52. End cap 52 contains a standard four pin socket 53 into which is plugged a cable 54. Cable 54 is the means by which the probe 30 is connected to surface equipment and through which data is sent for the imaging process. Electronic surface equipment for downhole receiver 30 comprises a signal strength display/recorder, a modem, and a radio transmitter/receiver for sending a reference signal between probes when the probes are operated in the FM mode.

To ensure that the probe is centrally located within the borehole, a borehole probe centralizer is fitted to the probe as shown in FIG. 3a. This centralizer includes a proximal end cap 55 which is attached to the probe proximal end cap 52. End cap 55 has a central aperture through which cable 54 may pass. Sleeve 56 fits snugly around the distal end of outer cylinder 40 of probe 30. Attached to both end cap 55 and sleeve 56 are three to four bands 57. These bands 57 are of a strong flexible material such as thin stainless steel. The bands 57 are prestressed to curve convexly outward to contact the inside walls of the borehole. The bands 57 are sufficiently flexible to urge the probe 30 into the borehole's center, and to allow for easy passage of the probe down the borehole.

The preferred embodiment contemplates modular design of the components of both the downhole probes 30 and the in-seam instruments 10 and 20. In this way, cost of production is reduced and repair and servicing is simplified. FIG. 4 is a general block diagram of the components, showing the modular design.

Table 1 is an equipment identification chart identifying the modular components and Table 2 is a configuration matrix showing the composition of each downhole probe 30 and in-seam instrument 10 and 20.

TABLE 1

| Module | Identification |
|---|---|
| A1 | Receiver |
| A3 | Transmitter |
| A10 | $C^3$ Modem |
| A13 | Display/Recorder |
| B6 | NiCad Battery |
| | Tuned Loop Antenna Enclosures |
| C1 | Downhole |
| C2 | Porthole |

TABLE 2

| | CONFIGURATION MATRIX | | | | | | |
|---|---|---|---|---|---|---|---|
| Instrument | A1 | A3 | A10 | A13 | B6 | C1 | C2 |
| Downhole 30 | | | | | | | |
| Transmitter | | 1 | 1 | | 1 | 1 | |
| Receiver | 1 | | 1 | | 1 | 1 | |
| Surface | | | 1 | 1 | | | |
| In-seam (10 or 20) | | | | | | | |
| Transmitter | | 1 | | | 1 | | 1 |
| Receiver 10 | 1 | | | 1 | 1 | | 1 |

Examples of equipment specifications are shown in the following Tables 3-7. Table 3 describes the general system operating parameters. Tables 4 and 5 illustrate the transmitter and receiver specifications, respectively. Table 6 describes the transmitter and receiver antenna characteristics and Table 7 gives the specifications for the modem.

TABLE 3

| SYSTEM SPECIFICATIONS | |
|---|---|
| Signal Emissions: | |
| Type | CW and Narrowband FM |
| Frequency Range | 100 to 800 kHz |
| Tuning | 5 kHz Increments |
| Peak Deviation | 100 Hz |
| Modulation: | |
| Frequency Range | 200 Hz |
| Environmental: | |
| Operating Temperature | −40 to 80 Degrees C. |
| Probe | 500 PSI |

TABLE 4

| TRANSMITTER | |
|---|---|
| Type | Complimentary Class B |

TABLE 4-continued

| TRANSMITTER | |
|---|---|
| Module Description | A3 |
| Frequency Range | 100 to 800 kHz |
| Tuning | 5 kHz Increments |
| Output Power | 20 Watts |
| Flatness | ±½ DB |
| RF Load Impedance | 50 and 200 Ohms |
| VSWR 3:1 Max | |
| Mixer Oscillator | 10.7 MHz |
| Signal Oscillator | 100 Hz |
| Power Requirements | |
| Operating Voltage | 9 to 15 Volts DC |
| Demand Current | 3.5 Amperes |
| Connectors | |
| Type | Molex |
| Output Power | 2 |
| VCC | 1 |
| Ground | 1 |
| Fiber Optics Cable (Reference) | 1 |

TABLE 5

| RECEIVER | |
|---|---|
| Type | Single Conversion Superhetrodyne |
| Module Description | A1 |
| Frequency Range | 100 to 800 kHz |
| Tuning | 5 kHz Increments |
| IF Frequency | 10.7 MHz |
| Source Impedance | 50 Ohms |
| Sensitivity | 0.1 Microvolts for 12 dB Sinad |
| IF Frequency | 10.7 MHz |
| Selectivity | |
| 3 dB BW | 200 Hz Min |
| 70 dB BW | 1 kHz |
| Audio | |
| Squelched | 50 dB Min |
| Unsquelched | 30 dB (100 UV) |
| Load 8 Ohms | |
| Frequency Response | |
| 3 dB | 10, 70, 100 Hz |
| Voltmeter | |
| Type | Sychronized with transmitter local oscillator |
| Range | 0 to 360 degrees |

TABLE 6

| ANTENNA | |
|---|---|
| Type | Tuned Loop Antenna |
| Frequency Range | 100 to 800 kHz |
| Number of Turns | 11 |
| Magnetic Moment | |
| Downhole | 8 $ATM^2$ @ 20W |
| Portable | 8 $ATM^2$ @ 20W |
| Heading | |
| Type | Flux Gate Compass (Downhole) |

TABLE 7

Figure 6:
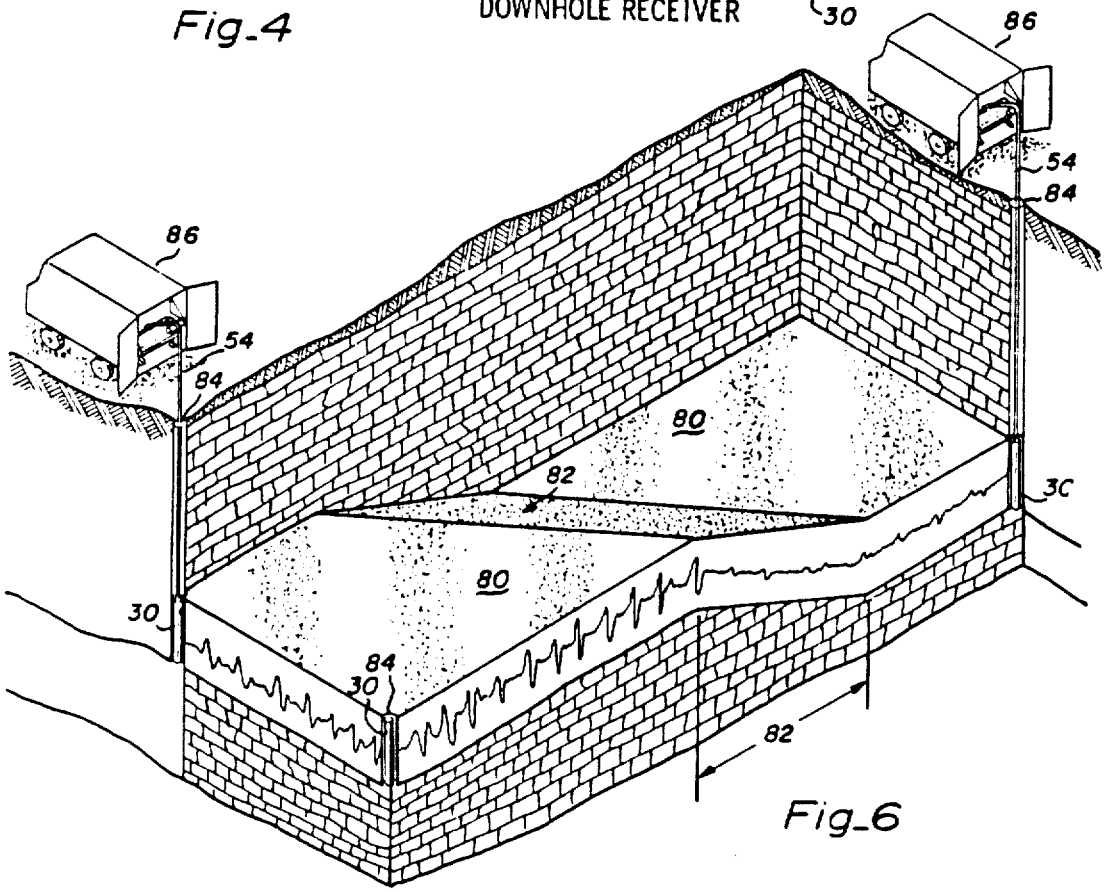
FIG. 6 is an idealized cut-away view of a coal seam showing boreholes adjacent to the coal seam with downhole probes and surface equipment in position.

| $C^3$ MODEM | |
|---|---|
| Type | Manchester Code Format 1b Bit Code |
| Function | |
| Power | On/Off |
| Antenna Position | ±30 of Command |

Where there is no immediate access to the coal seam, surface imaging is performed using the downhole probes 30 inserted into a series of boreholes around the seams perimeter. This procedure is represented in FIG. 6.

Imaging of the seam is based upon the differential conductivity of coal and the anomalous structure. The conductivity of rock is several orders of magnitude greater than the conductivity of coal. The vertical orientation of the transmitting tuned loop antenna produces a horizontal magnetic field $H_\phi$ and a vertical electrical field $E_Z$. These fields are almost constant over the height of the coal seam. At large radial distances from the antenna, the fields decay exponentially at a rate determined by an effective attenuation constant $\alpha$ which depends on losses both in the coal and in the rock, and on the dielectric constant of the coal. The attentuation rate is expected to increase as the coal seam thickness decreases, coal seam conductivity increases, and the relative dielectric constant increases. The attenuation rate decreases as the rock conductivity increases. The rate also depends upon frequency of the transmitted signals, and on water content of the seam. Measured results by Emilie and Lagace indicate an attentuation rate in coal of approximately four dB/100 feet. This forms the basis for the coal seam continuity imaging method.

The tuned loop antennas excite the natural low loss coal seam mode signal in accordance with the following equation (1):

$$H_\phi = \vec{M}\, f(r\alpha\epsilon_c\epsilon_r\sigma_c\sigma_r) \quad (1)$$

where M is the magnetic moment of the transmit antenna, r is the range from the transmitter to the receiver antennas, $\alpha$ is an attenuation constant, h equals the seam height, $\epsilon_c$ and $\epsilon_r$ are the seam and rock permitivities respectfully, and $\sigma_c$ and $\sigma_r$ are the seam and rock conductivities.

The magnetic moment M is itself dependent on transmit power $P_o$, and bandwidth BW as represented by equation (2):

$$M = C\sqrt{\frac{P_o}{BW}}$$

Together, these equations indicate that the tuned loop antennas will excite the natural coal seam mode magnetic moment and thus provide the highest magnetic moment resulting in the longest range. Narrow system bandwidth also leads to improved receiver sensitivity $S_{dB}{}^{10}$ for a 10 dB IF signal-to-noise ratio is given by equation (3):

$$S_{dB}{}^{10} = -164 + 10\mathrm{Log}_{10}BW_{IF} + 10\mathrm{Log}_{10}NF \quad (3)$$

where $BW_{IF}$ is the IF bandwidth of the signals and NF is the noise figure at the receiver.

Equation 3 thus shows that sensitivity increases as bandwidth decreases. The results of equations (1), (2) and (3) indicate that continuous wave LMF signals are optimum for the geophysical survey instruments. This is because their narrow bandwidth results in signal propagation in coal with the lowest attenuation rate (Equation 3) and highest magnetic moment (Equations 1 and 2). The net result is that the operating range of the instruments is maximized at a specified output power.

The imaging method is dependent on a comparison of the calculated signal strength with the measured signals strength as determined by the CW, LMF instruments.

An analysis of the calculated signal strength is helpful to understanding of the method. To provide a baseline reading for the imaging method, Equation (1), previously referred to, is used to calculate the expected signal strength in a particular coal seam. This is accomplished by measuring the various parameters at the particular seam and applying these results to Equation (1).

The propagated signal is received in the far side receiver. Because of either an increase in the "effective" seam conductivity or a decrease in height of the seam, wave propagation along a faulted seam path will result in greater attenuation rate. Thus, by comparing the level of a number of received signals, path anomalies can be detected. Additionally, the refractive index of LMF signals varies slowly in pure coal, thus the signals travel on a straight line path. Propagation in coal takes the form of a parallel plane, transverse electromagnetic (TEM) transmission-line type mode, with the electric field vertical and the magnetic field horizontal within a planar seam bounded above and below by more conductive rock. Seam anomalies such as rock have a different refractive index than coal, thereby deflecting the signal path to a greater degree. The narrowband-FM signals allow for measurement of this path attenuation, thus providing a second means of detecting anomalies. Finally, phase shift of the FM signal along the path also indicates the presence of anomalous formations within the seam.

When greater resolution is desired tomographic, rather than continuity imaging techniques are employed. Tomography results in high resolution by employing the lowest attenuation rate frequency and making more frequent spatial measurements. The attenuation rates are measured at each spatial orientation of transmitter and receiver and the resulting data points are analyzed using computer aided imaging techniques to yield a pictorial representation of the anomaly.

To obtain good resolution, the distance between the transmitter and receiver should be greater than $\lambda_c/2\pi$ where $\lambda_c$ is the signal wavelength in coal. Thus, for the 520 kHz transmission frequency of the preferred embodiment, the wavelength in coal is 97.7 meters. This yields a minimum separation distance of 15.56 meters.

The in-seam tomographic imaging method as illustrated in FIG. 5, accordingly is carried out with portable entry receiver 10 and transmitter 20 in a manner determined to maximize resolution. Tuned loop (short magnetic dipole) antenna 21 of transmitter 20 is designed to excite the natural coal seam mode azimuthal magnetic field component ($H_{100}$), at a preselected wavelength in the 100–800 kHz range, thus providing the highest field strength at a given power output. Receiver tuned loop antenna 11 is placed in a co-planar alignment with transmitter antenna 21 to ensure maximum field strength. The instruments are separated by a distance of more than 15.56 meters for maximum resolution. In the preferred embodiment, a coal seam is 600 feet (200 meters) wide, thus ensuring adequate separation. It can be seen that a coal seam 70 contains within it a rock/sand barrier 74. This rock/sand barrier 74 will act as a radiogenic mass and cause an attenuation in the transmitted signal. Because tomography employs the lowest attenuation rate signal frequency allowing for minimization of transmitter output power, it is important that the head and tail gate entries do not include continuous electrical conductors. Such conductors create secondary magnetic fields that would interfere with received signal level measurements. To obtain adequate resolution in the tomographic in-seam survey a number of data must be collected by taking spatial measurements. The procedure is thus carried out by making a series of received signal level measurements at specific locations (designated as $X_0, X_1 \ldots X_n$) in the tail gate entry 76 for each transmitter location in the heat gate entry 78. Similarly, the transmitter 20 is placed at a series of specific locations (designate as $Y_0, Y_1 \ldots Y_n$) within the head gate entry 78 and the receiver 10 is placed at the corresponding locations in the tail gate entry 76. At each receiver location in the entry way distance logging keyboard 12 is used to enter coordinates representing the receiver's position relative to the transmitter. These coordinates are converted to digital signals and stored, along with the measured receive signal values, on the magnetic tape. In reconstructing the data, the signal strength measurements can be thus corrected for positional changes of the transmitter and receiver. The longitudinally spacing of transmitter and receiver locations is determined by the required image resolution. The resultant received signal data is converted to digital form and stored on the cassette tape 13 of receiver 10 and can be analyzed in a computer based tomography algorithm. Such computer aided imaging algorithms will provide a detailed picture of the seam structure. Computer generated data may also include a print-out of seam parameters(conductivity, ash content, etc.) and a digital tape for use by the mines' computer graphics terminal.

Surface based seam imaging equipment is deployed as shown in FIG. 6. The coal seam to be imaged is represented by general reference character 80. It can be seen that a fault 82 is present within the seam. In employing the surface base imaging procedure using a perimeter exploration protocol a plurality of drill holes 84 are drilled along the perimeter of the longwall panels. In the preferred embodiment two adjacent longwall panels, of a combined width of 1200 feed and a length of 6000 feet can be imaged with a ten-hole drilling plan. Such a drilling plan will detect seam anomalies within the panels. If a fault is detected in the panel a convergent search strategy is required to determine its heading. Such a search strategy is carried out by drilling bisecting boreholes within the perimeter to localize the fault. Surface imaging of the coal seam is accomplished in a manner similar to the in-seam imaging procedure. After the series of drill holes have been bored around the perimeter of the longwall panel, the surface probes 30 are inserted down the boreholes 84 to the depth of the coal seam which has been determined from the core samples. FIG. 6 illustrates a vertical displacement fault which results in one end of the coal seam being deeper than the other. Because the signals tend to propagate through the coal, the receiver probe 30 is placed within the coal seam and not necessarily at the same depth as the transmitter probe 30. Downhole probes 30, comprising a receiver probe and a transmitter probe are inserted in opposite drill holes 84. Receiver and transmitter antenna segments 48 are aligned in a co-planar manner by means of drive motors 49 located in the end of downhole probes 30. Antenna headings are determined and controlled through the use of surface control units including telemetry and control equipment and a modem. These units, together with the probe control equipment and cabling, are mounted in trucks 86. Continuous wave of FM low and medium frequency transmissions are made in a manner similar to those made in the in-seam imaging procedure and attenuation rate and/or phase shift are measured. The process is repeated with the receiver probe 30 and transmitter probe 30 in each of the boreholes 84.

This surface procedure may also be carried out from an underground surface. This situation occurs when a lower coal seam is being explored from an existing mined seam. The existing seam floor then becomes the surface into which boreholes are drilled for exploration of the lower seam. The downhole probes 30 are inserted into the boreholes and measurements taken in the normal surface exploration manner.

The resultant continuity data is analyzed to determine if areas of increased attenuation are present. Such areas indicate fault zones or other geological anomalies. If sufficient boreholes are drilled, the data can be analyzed using computer-aided tomographic imaging techniques to yield a pictorial result as with the in-seam procedure.

Additionally, floor/roof rock characteristics can be determined using continuous wave medium frequency continuity measurements. This procedure is analogous to the downhole seam continuity measurements except the receiver and transmitter probes 30 are positioned above the coal seam ceiling to measure roof conditions. The signals are thus propagated through the surrounding rock, and signal attenuation is measured. In this way, a determination respecting the type of rock and resulting roof/floor conditions can be made.

Vertical imaging wherein attenuation rates are measured in vertical plane is also an important capability. Imaging is accomplished by determining the complex propagation factor (attenuation rate) of an electromagnetic wave along straight ray paths in the geologic study zone. The attenuation rate depends on electrical properties (permitivity, permeability, and conductivity) of the transmission medium. The attenuation rate is theoretically known in a homogenous medium and the attentuation rate is known to change in zones of geologic disturbances. It is also known that the attentuation rate increases in fault zones where chemical mineralization has resulted in localized ore chutes of increased conductivity or it increases in water filled tunnels. The attenuation rate decreases in zones intersected by air filled tunnels, and in zones where geologic disturbances caused by mine tunnel blasting fractures adjacent rock structures.

The radio imaging method of the present invention allows for evaluation of geological structure in the vertical plane. Chemically mineralized ore zones and tunnels intersecting the imaging plane, may be graphically reconstructed using the method of this invention with available tomography algorithms. For example, where there is a tunnel in the geological structure, a restructured image shows that hallows of geologic disturbances can be detected in the rock surrounding the tunnel. In such an environment a plurality of drill holes may be positioned. Then a downhole radio transmitter is placed in one drill hole and a downhole radio receiver is placed in a second drill hole. Each hole shall have a number of measuring stations, e.g. twenty-five, each at a different vertical elevation. Using twenty-five measuring stations in each drill hole, as an example, 625 receiver measurements may be taken and used to determine average attenuation rate along paths between the downhole transmitter and downhole receiver at each location. The data may then be compiled and analyzed in a computerized tomography algorithm which in turn determines the attentuation rate in each of the 625 cells which cover the entire vertical image plane.

The vertical evaluation of a geological structure will reveal the image of anomalies, e.g. tunnels, voids and chemically mineralized ore zones, etc. Experimentation has shown that a correct model of the electromagnetic wave imaging signal propagating along a straight ray path is predominantly a plane wave exhibiting spherical spreading. The magnetic field component of the electromagnetic (EM) quasi plane wave is mathmatically:

$$H_\phi = C\frac{e^{-ar}}{r}$$

where r is the radial distance from the source (feet);

$\alpha$ is the attenuation rate in rB per hundred feet; and

C is a constant

Figure 7:
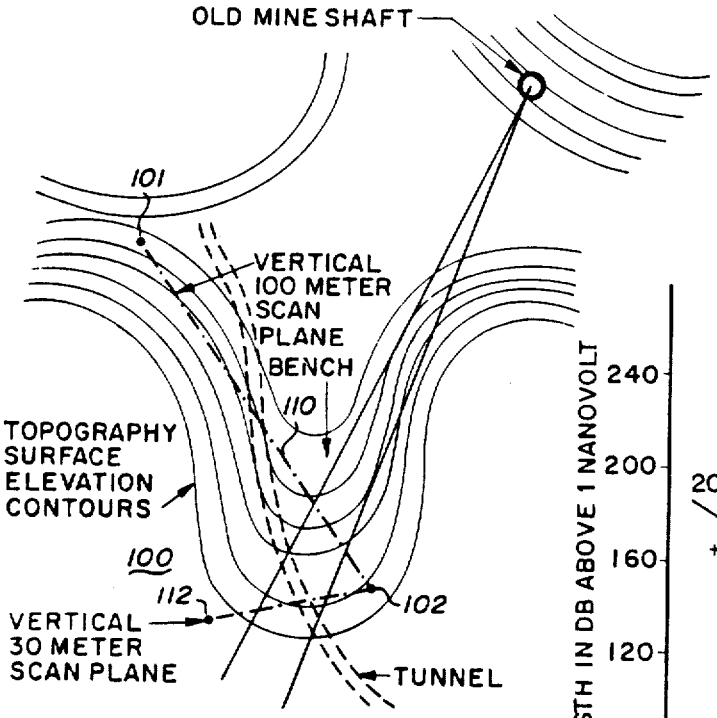
FIG. 7 is illustrates a tunnel study area of a geological formation wherein the receiver communicates with transmitters from two different locations.
Figure 8:
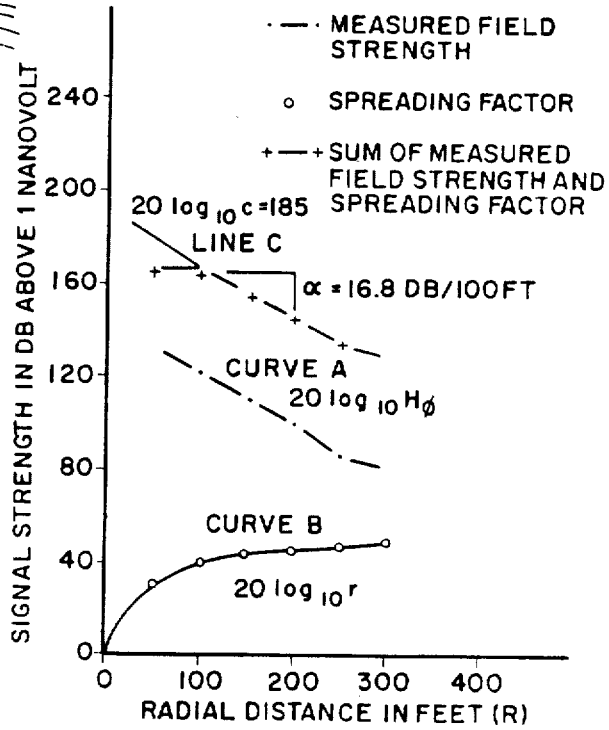
FIG. 8 is a graphical reading of measured field signal strength versus radial distance from radiating antenna.

In conducting experimentation, receiver measurements were made along the centerline of the tunnel shown in FIG. 7. When the transmitter was located in a select borehole, the measured data is shown in FIG. 8, the average attenuation rate in an underground tunnel was 16.8 dB per 100 feet which is near the theoretical rate of 18.6 dB per 100 feet. The "c" factor was found by the analytical construction in FIG. 8 to have a value of 185. Experiments were conducted with an image frequency of 300 kHz exhibiting a wavelength of 305.7 feet in the schist medium. Since the wavelength is much greater than the diameter of the drillhole and tunnel, propagation disturbances from reflection mechanisms are minimized. Also, the tunnel cut-off frequency is approximately 22 MHz thereby negating tunnel wave propagation with potential resulting measurements interference problems. After correcting the measured data $20\text{Log}_{10}H_\theta$, (see curve A of FIG. 8), for the effects of spherical spreading, $20\text{Log}_{10}r$, (see curve B of FIG. 8), the resulting line C is of slope which is the attenuation rate of the EM wave in the schist medium. Thus, the existence of the tunnel was helpful in determining the nature of wave propagation in the semi-homogenous medium.

Figure 9:
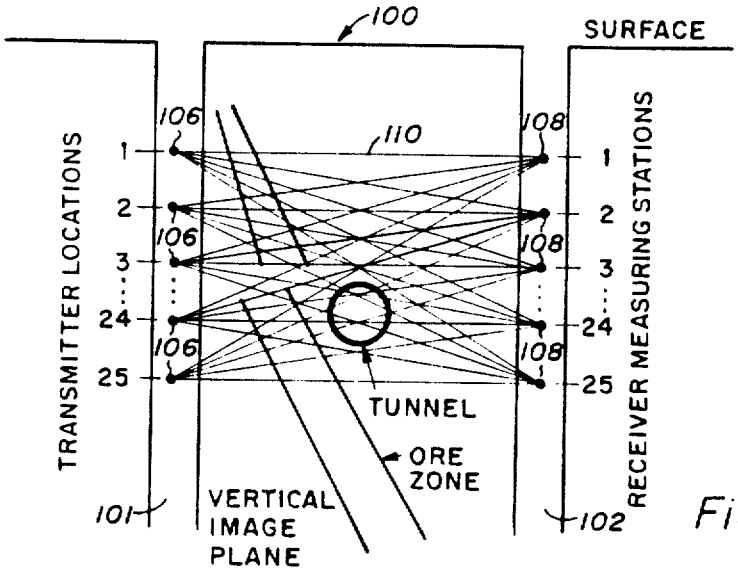
FIG. 9 is a diagrammable illustration of vertical imaging for a geological formation.

FIGS. 7 and 9 diagrammatically illustrates a vertical imaging plane set-up for a geological formation referred to by the general reference character 100. Drill holes 101 and 102 are drilled at different locations in the geological formation 100. These holes establish the vertical edges of the reconstructed image. Within the downhole 101 is positioned a plurality of downhole transmitter location stations 106 and in the down hole 102 is positioned a plurality of downhole receiver measuring stations 108. There are a plurality of transmitter stations, e.g. FIG. 9 illustrates twenty-five each thereby allowing for 625 readings. In collecting the data the downhole transmitter 30 is first positioned at the first station 106 within drillhole 101 and the downhole receiver at the first receiver station 108 in drillhole 102. At these locations, an imaging signal is sent from the transmitter location 106 to the receiver measuring station 108 where its level or phase is measured. Then, downhole receiver station is moved to the second receiver station 108 in drillhole 102 and the measurement is repeated. The process is repeated for each other receiver station 3–25 in downhole 102. Then, the downhole transmitter is moved to transmitter station 2 in drillhole 101 and data is accumulated for each of receiver stations 1–25 in drillhole 102. Then, the downhole transmitter is successively positioned at transmitter stations 3–25 within drillhole 101 and the process is repeated. For illustrative purposes in FIG. 9, straight ray paths 110 of the EM signals are illustrated as projecting from each of the transmitter location 106 to the multiple receiver stations 108. For example, each transmitter location establishes an EM ray path pattern 110 to each receiver station.

In conducting a survey, after all measurements are compiled between a pair of drillholes, then the downhole transmitter 106 may be moved to another drillhole. To illustrate, FIG. 7 illustrates a tunnel study area within the geological study area 100, with drillholes 101 and 102 illustrated. After the images are compiled between drillholes 101 and 102, which may be separated by 100 meters, the downhole transmitter may be moved to a drillhole 112 and the image planes comprising ray paths 110 again established between drillholes 112 and 102, which may be separated by 30 meters or more. The vertical distance and positioning of the transmitter stations and receiver stations within the drillholes 101, 102 and 112 should preferably be accurately known. This can be achieved by using a wireline winch measuring equipment, so that the vertical distance from the top flange of the cased drillholes 101, 102, 112, etc. to each measuring station is accurately determined.

In carrying out the method, a receiver may be lowered to a specified depth designated as the starting measuring station 108 near the top of the drillhole 102. A companion downhole transmitter is lowered in a corresponding station 106 in downhole 102 or 112. From each transmitter station 106, a radiating antenna is placed in a vertical plane and excites electromagnetic (EM) wave propagation on the ray paths 110 as illustrated in FIG. 9. The antenna is a small magnetic dipole which forms a tuned resonant loop in a vertical plane. Likewise, the receiver has a small magnetic dipole antenna with a resonant loop in a vertical plane.

With the tuned resonant loop antenna the transmitter produces a horizontal magnetic field component which is received by a companion tuned loop antenna at the receiver station. The magnetic field components of the ray paths 110 intersect a receiving tuned resonant loop antenna inducing an electromotive force (EMF) voltage that is measured by the receiver in the drillhole 102. This voltage value is within the calibration factor of the actual magnetic field component value. The voltage may be extremely small and measured (recorded) with respect to decibels above one nanovolt. As the EM wave travels along every radial ray path from the downhole transmitter to the downhole receiver, it reacts with the medium causing a measurable loss of energy. As a result, the strength of the magnetic field component decays with distance along the path. Along the path (farfield), the predominate magnetic field ($H_{100}$) component is mathematically given by:

$$H_\phi = c\frac{e^{-ar}}{r} \tag{4}$$

The decay in the magnetic field component is in part due to the spherical spreading of the wave as it propagates away from the electrically short magnetic dipole antenna in the denominator of equation 4. The constant first power of radial distance (r) from the radiating antenna in the denominator of equation 2. The constant c depends upon the magnetic moment of the radiating antenna and is given by:

$$M \approx NIA \approx K\sqrt{\frac{P_o}{BW}} \tag{5}$$

where

K is the area constant of the loop antenna;

N is the number of turns in the loop antenna;

I is the peak current circulating in the loop antenna; and

A is the area of the antenna.

The right hand term in equation 5 expresses the dependence of moment (M) on transmitter power ($P_o$) and antenna bandwidth (BW). A ten fold increase in transmitter power increases the magnetic moment by 10 dB. The constant c in equation 4 is dependent upon the conductivity (r) of the medium 100. The decay along the path is also strongly dependent upon the attenuation rate ($\alpha$) of the EM signal in the medium 100. The attenuation rate of a plane wave is mathematically represented by:

[

$$a = \omega\left[\frac{\mu_o\epsilon}{2}\left(\sqrt{1+\left(\frac{\sigma}{\epsilon\omega}\right)^2}+1\right)\right]^{\frac{1}{2}} \tag{6}$$

]

$$a = \omega\left[\frac{\mu_o\epsilon}{2}\left(\sqrt{1+\left(\frac{\sigma}{\epsilon\omega}\right)^2}-1\right)\right]^{\frac{1}{2}} \tag{6}$$

where $\omega$ is the radian frequency of the RIM signal;

$\mu_o$ is the magnetic permeability of the medium 100 (e.g. $4\pi\times10^{-7}$ for non-magnetic rock);

$\epsilon=\epsilon_r\epsilon_o$ is the dielectric constant of the medium 100 $\epsilon_r=10$ for schist rock);

$$\epsilon_0 = \frac{1}{36\pi\times10^{-9}};$$

and $\sigma$ is the conductivity (mho/meter) of the medium 100.

Figure 10A:
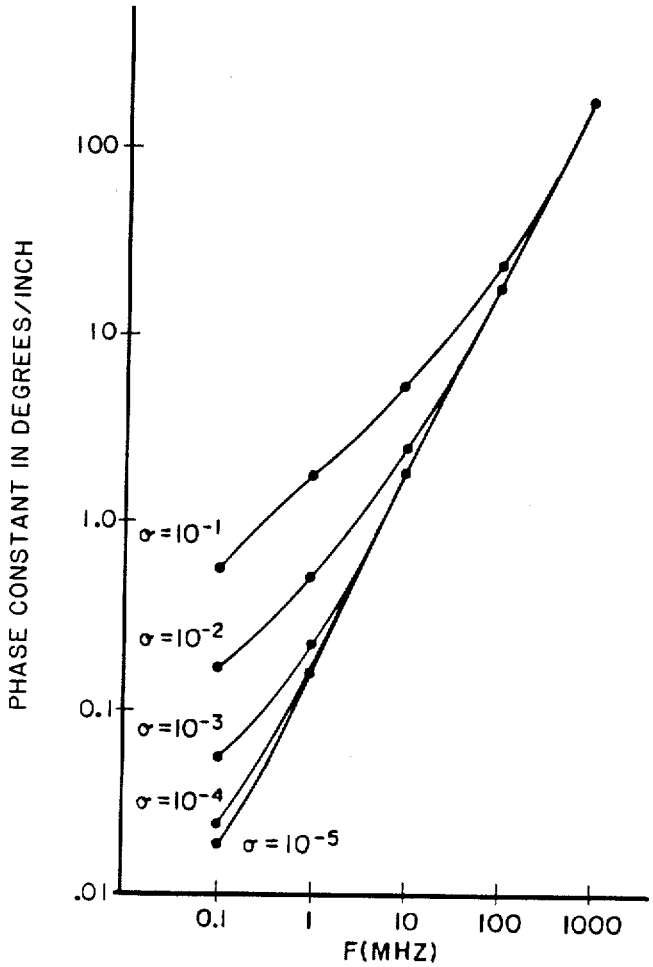
FIGS. 10A and 10B illustrate vertical RIM cross-hole survey results with FIG. 10A illustrating the tomography [attentuation rate] *phase constant* versus frequency and FIG. 10B and attenuation rate isopach map.

For each downhole receiver location 108, the signal at each end of the ray paths 110 from the radiating loop antenna is measured and recorded in dB above one nanovolt. The measured data is then compiled and anaylzed in a computerized tomography algorithm. As illustrated in FIG. 10A, the [attenuation rate] *phase constant* depends upon the conductivity (mhos per meter) of the media. Below 300 KHz the [attenuation rate] *phase constant* is very sensitive to the conductivity of the media. The tomography algorithm determines the attenuation rate in the vertical survey planes shown in FIG. 10B.

Figure 10B:
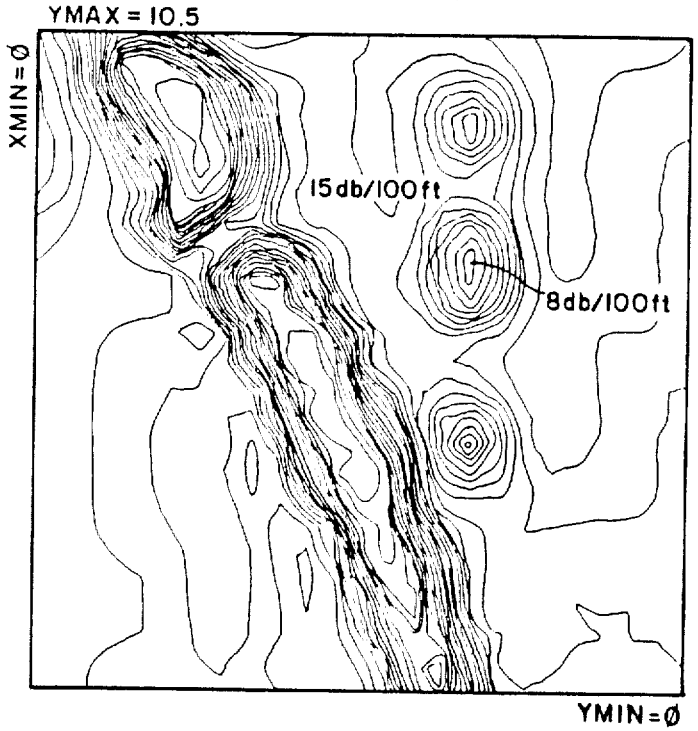

The attenuation rate data is used in a contouring program to draw contours of constant attenuation in the plane of the image, in increments of one db per 100 feet. The contour lines reconstruct the image of the geologic structure as illustrated in the isopach map of FIG. 10B. The image cells may be 5 ft.×3.9 ft. and 5 ft.×13 ft. in the 30 and 100 meters scans, respectively. FIG. 10B illustrates the contours of constant attentuation for the ore zone on the left side of the image and three tunnels, one over the other, are shown on the right.

It may be useful to briefly describe some aspects of the electromagnetic wave propagation theory in a slightly conducting medium. The EM radiating antenna is an electrically short magnetic dipole. The magnetic dipole antenna produces a farfield toroidal antenna pattern and the plane of the physical antenna lies in the x-y plane. The magnetic moment vector (M) is normal to the plane of the physical antenna coincident with the z axis. The antenna produces a radial magnetic field component ($H_r$), an azimuthal magnetic field component ($H_\phi$) and an electric field component ($E_\theta$). In free space the field equations are given by:

$$[H_\phi = \frac{MB^3}{4\pi}\left[\frac{-1}{(Br)} - \frac{1}{j\,(Br)^2} + \frac{1}{(Br^3)}\right]e^{-jBr}\sin\theta;] \quad (7)$$

$$\neq H_\phi = \frac{Mk^3}{4\pi}\left[\frac{1}{(kr)^3} - \frac{1}{j\,(kr)^2} - \frac{1}{kr}\right]e^{-jkr}\sin\theta \quad (7)$$

$$[H_r = \frac{MB^3}{2\pi}\left[\frac{-1}{j\,(Br)^2} + \frac{1}{(Br)^3}\right]e^{-jBr}\cos\theta;] \quad (8)$$

$$H_r = \frac{Mk^3}{2\pi}\left[\frac{1}{(kr)^3} - \frac{1}{j\,(kr)^2}\right]e^{-jkr}\cos\theta \quad (8)$$

$$[E_\theta = \frac{MB^4}{4\pi\omega\epsilon_o}\left[\frac{-1}{(Br)} - \frac{1}{j\,(Br)^2}\right]e^{-jBr}\sin\theta;] \quad (9)$$

$$E_\theta = \frac{Mk^3}{4\pi}\left[\frac{\mu}{\epsilon}\right]^{\frac{1}{2}}\left[-\frac{1}{kr} - \frac{1}{j\,(kr)^2}\right]e^{-jkr}\sin\theta \quad (9)$$

where [$B=2\pi/\lambda$ (radians/meter).] $k=B-j\alpha$ (*i.e. k=the complex wave number); B is the phase constant in radians/meter; and α is the attenuation rate in nepers/meter.*

As r becomes large, the terms involving $r^{-1}$ become predominate and the farfield magnetic field terms follows from equation 5 as:

$$[H_\phi = \left[\frac{MB^2}{4\pi}\right]\frac{e^{-ar}}{r};\ \theta = 90°.] \quad (10)$$

$$H_\phi = \left[\frac{Mk^2}{4\pi}\right]\frac{e^{-ar}}{r};\ \theta = 90° \quad (10)$$

The bracket term mathematically represents the constant term in equation (4).

In the near vicinity of the borehole antenna, the predominate magnetic field terms are magnetic. Therefore, the antenna near field energy is stored in its magnetic fields. By way of contrast, if the antenna structure was a short electric dipole, the dual of equations 7 through 9 would mathematically define the near field components $E_{100}$, $E_r$ and [$H_{100}$] $H_\theta$, The electric field terms $E_\phi$ and $E_r$ would dominate. These terms would cause a current density [$J=6E$] $J=\sigma E$ to flow in the medium in close proximity to the antenna causing a substantial dissipation loss of energy thereby resulting in a very short unacceptable imaging system. We thereby see the advantage of using the short magnetic dipole antenna in subterranean imaging.

FIG. 11 illustrates the range electrical property values of a typical geological material expected with an imaging frequency of 300 KHz. For comparison purposes, the attenuation rate (α) of a plane EM wave in the lake water, schist, and coal mediums were calculated from Equation 6 and illustrated in Table A.

TABLE A

PLANE EM WAVE ATTENUATION RATE IN A HOMOGENEOUS MEDIUM AT 300 KHz

| Conductivity in mhos/meter | dB/100 ft. |
|---|---|
| $10^{-2}$ (lake water) | 26.48 |
| $4 \times 10^{-3}$ (schist) | 18.6 |
| $4 \times 10^{-4}$ (coal) | 7.88 |

The table shows that the attenuation rate in schist should be near 18.6 dB/100 ft. The phase [rate] *constant* may be determined from:

$$[B = \omega\left[\frac{\mu\epsilon}{2}\left(\sqrt{1+\left(\frac{\sigma}{\epsilon\omega}\right)^2} - 1\right)\right]^{\frac{1}{2}}] \quad (11)$$

$$B = \omega\left[\frac{\mu\epsilon}{2}\left(\sqrt{1+\left(\frac{\sigma}{\epsilon\omega}\right)^2} + 1\right)\right]^{\frac{1}{2}} \quad (11)$$

The wavelength $$\left(\lambda = \frac{2\pi}{B}\right)$$

and skin depth $$\left(\delta = \frac{1}{\alpha}\right)$$

of plane waves propagating in coal and schist mediums are illustrated in Table B.

TABLE B

WAVELENGTH AND SKIN DEPTH IN A HOMOGENEOUS MEDIUM

| Conductivity (mhos/meter) | Wavelength (λ) (meter/feet) | Skin Depth (δ) (meter/feet) |
|---|---|---|
| $4 \times 10^{-3}$ (schist) | 93.22/305.7 | 14.2/46.6 |
| $4 \times 10^{-4}$ (coal) | 395.2/1296 | 33.6/110.2 |

Magnetic field strength ($H_{100}$) measurements are made at various location in the tunnel. The measurements are made when the transmitting antenna is in drillhole 101. The measurements are made with a tuned loop antenna and portable field strength meter. The antenna output voltage is measured. For example, Table C illustrates the antenna output voltage which is within a constant of the field strength inside a tunnel.

TABLE C

MEASURED FIELD STRENGTH INSIDE OF TUNNEL (dB re 1 nanovolt)

| Measuring Station | Appoximate Distance (ft) | Field Strength Center of Tunnel (dB per nanovolt) |
|---|---|---|
| 1 | 300 | 85.6 |
| 2 | 250 | 82 |
| 3 | 200 | 86 |
| 4 | 150 | 101 |
| 5 | 100 | 111 |

TABLE C-continued

| MEASURED FIELD STRENGTH INSIDE OF TUNNEL (dB re 1 nanovolt) | | |
|---|---|---|
| Measuring Station | Appoximate Distance (ft) | Field Strength Center of Tunnel (dB per nanovolt) |
| 6 | 50 | 123 |
| 7 | 50 | 131 |

The measured data ($20 \log_{10} H_\phi$) was plotted in FIG. 8 (long dash-dot curve). Assuming farfield radiation conditions, the measured data should correspond to the logarithmic form of equation 4 given by:

$$20\log_{10}H_\phi = 20\log_{10}\left[\frac{c\,e^{-ar}}{r}\right] = 20\log_{10}c - ar - 20\log_{10}r. \tag{12}$$

Two additional curves are constructed in FIG. 8 to enable the determination of c and $\alpha$ from the measured data. The upper curve (plus-dash) was constructed by adding the spherical spreading factor ($20\log_{10}r$) to each measured data point. The constructed curve should be linear for measurements made in excess of:

$$r > \frac{\lambda}{2\pi} = \frac{305.7}{6.28} = 48.67' \tag{13}$$

from the radiating antenna.

The constructed line is approximately linear with a slope of 16.8 dB/100 ft. when $r > 100'$. This seems to confirm strong spherical spreading of the RIM image signal in the schist medium. The measured attenuation rate is in agreement with the expected schist attenuation rate given in Table A. The constant factor is seen to have a value of 185.0 dB [per nanovolt] *above one nanovolt.*

In the homogenous schist medium, the constant c may be analytically determined by substituting equation 10 into the bracket term in equation 8. The antenna coupling constant is mathematically represented by:

$$c = \frac{M\mu_0\sigma f}{4}\,;\ \sigma > \omega\epsilon \tag{14}$$

where $\sigma$ is the conductivity of the medium;

$\mu_0$ is the magnetic permeability;

$\epsilon$ is the permitivity; and is the frequency of the imaging signal.

In non-magnetic rocks, the magnetic permeability remains constant at the free space value of $4\pi \times E-07$. The imaging signal frequency (f) and the antenna magnetic moment (M) are also constants. The coupling constant is directly proportional to the conductivity ($\sigma$) of the schist medium. It can also be shown that the constant depends upon the inverse square of the signal wavelength in the mediums. The wavelength ratio relative to a coal medium is given by $k = 395m/93m = 4.24$. This would produce a $20\log_{10}k = 25.12$ dB increase relative to that found in a coal seam. The measured c value in coal is 160; therefore, an expectation of 185 is in close agreement with the measured schist value.

Vertical imaging, i.e. measuring attenuation rates in a vertical plane, as taught herein allows for the vertical reconstruction of tomography images of faults. This is also an important discovery for hard rock mining since chemical mineralization occurs in these areas in a subterranean environment.

The vertical imaging method may also be applied to gas and oil reservoir analysis. As illustrated in FIG. 13, since the conductivity of a sand reservoir decreases when the communicating pores are filled with oil or natural gas and increases when filled with water, the conductivity contrasts between the petroleum reservoir and water reservoir cause the attenuation and phase shift rates to marketly change the ray paths intersecting different mediums.

Although the present invention has been described in terms of the presently preferred embodiments, it is to be understood that such disclosure is not to be interpreted as limiting. Various alterations and modifications will no doubt become apparent to those skilled in the art after having read the disclosure. Acordingly, it is intended that the appended claims be interpreted as covering all alterations and modifications as fall within the true spirit and scope of the invention.

I claim:

1. A method for imaging geologic anomalies in a vertical plane in underground geological formations comprising:

drilling a plurality of downholes about said formation and at locations remote from each other;

placing within a first of said downholes a transmitter having continuous wave transmit capabilities in a medium frequency range of approximately 100 KHz to approximately 800 KHz, the transmitter including a short magnetic dipole antenna for propagation of waves through said seam;

placing within a second of said downholes a receiver having continuous wave receive capabilities in a medium frequency range of approximately 100 KHz to approximately 800 KHz, the receiver including a vertical tuned resonant loop antenna for receiving waves propagated by said transmitter, said receiver further including measuring and recording means for measuring and recording a plurality of characteristics of said received propagated waves;

successively changing the elevation of said transmitter in said first hole to different transmitter stations;

at each transmitter station, transmitting a plurality of transmissions of continuous wave medium frequency waves with spherical spreading and an azimuthal magnetic field component propagated toward and received by said receiver antenna;

measuring a plurality of signal transmission characteristics of the received azimuthal magnetic field components;

calculating a plurality of expected signal transmission characteristics of signals propagated through said formations; and comparing said calculated signal transmission characteristics with said measured signal transmission characteristics and generating, by tomography reconstruction, geographical representation of said vertical formation therefrom.

2. The method of claim 1 including the further step of, with said transmitter at each transmitter station, successively changing the elevation of said receiver in said second hole to different receiver stations.

3. The method of claim 1 including the further step of, predetermining the distance between each transmitter station and successively moving said transmitter to said predetermined transmitter stations.

4. The method of claim 2 including the further step of, predetermining the distance between each receiver station and successively moving said receiver station to said predetermined receiver stations.

5. The method of claim 2 wherein, each successive change in elevation of the transmitter is substantially equal to each successive change in elevation of the receiver.

6. The method of claim 2 including the further steps of, removing the transmitter from the first of said downholes;

placing the transmitter within a third of said downholes and successively changing the elevation of said transmitter in said third hole to different transmitter station;

at each transmitter station within said third hole, transmitting a plurality of transmissions of continuous wave medium frequency waves with an azimuthal magnetic field component propagated toward and received by said receiver antenna;

measuring a plurality of signal transmission characteristics of the received azimuthal magnetic field components;

calculating a plurality of expected signal transmission characteristics of signals propagated through said formation; and comparing said calculated signal transmission characteristics with said measured signal transmission characteristics and generating, by tomography reconstruction, a geographical representation of said vertical formation.

7. The method of claim 1 wherein, the short magnetic dipole antenna is a vertical tuned resonant loop antenna.

* * * * *